(12) United States Patent
Sumner

(10) Patent No.: US 9,532,211 B1
(45) Date of Patent: Dec. 27, 2016

(54) DIRECTING SERVER CONNECTION BASED ON LOCATION IDENTIFIER

(71) Applicant: Sprint Communications Company L.P., Overland Park, KS (US)

(72) Inventor: Bret D. Sumner, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 640 days.

(21) Appl. No.: 13/968,259

(22) Filed: Aug. 15, 2013

(51) Int. Cl.
*H04W 4/02* (2009.01)
*H04W 88/06* (2009.01)
*H04W 8/24* (2009.01)

(52) U.S. Cl.
CPC ............ *H04W 8/245* (2013.01); *H04W 4/02* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 7,027,773 B1 | 4/2006 | McMillin | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 7,991,988 B2 | 8/2011 | Chen | |
| 8,107,926 B2 | 1/2012 | Goto | |
| 8,185,097 B2 | 5/2012 | Vanderlinden et al. | |

(Continued)

FOREIGN PATENT DOCUMENTS

| | | |
|---|---|---|
| EP | 2461613 A1 | 6/2012 |
| GB | 2292047 A | 2/1996 |

(Continued)

OTHER PUBLICATIONS

Notice of Allowance dated Apr. 26, 2012, U.S. Appl. No. 12/962,620, filed Dec. 7, 2010.

(Continued)

*Primary Examiner* — Daniel Lai

(57) ABSTRACT

A method of customizing a mobile communication device comprising: receiving, at the mobile communication device, a signal comprising an identification code, comparing the identification code with a plurality of mobile network codes and a plurality of mobile country codes stored in a memory of the mobile communication device, identifying a reference based on the comparing, wherein the reference defines an addressable location providing access to a customization package, and selectively connecting to an open mobile alliance server based on the reference. The method further comprises sending a request to the open mobile alliance server for a customization payload to be sent to the mobile communication device, receiving, at the mobile communication device, the requested customization payload from the open mobile alliance server, and customizing an aspect of the mobile communication device in response to receiving the customization payload.

17 Claims, 8 Drawing Sheets

(56) References Cited

U.S. PATENT DOCUMENTS

| | | |
|---|---|---|
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,571,536 B2 | 10/2013 | Urbanek |
| 8,612,967 B1 | 12/2013 | Delker |
| 8,626,165 B1 | 1/2014 | Narasimhan et al. |
| 8,639,245 B2 | 1/2014 | Shi et al. |
| 8,666,383 B1 | 3/2014 | Mauer et al. |
| 8,699,377 B2 | 4/2014 | Veillette |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,211 B2 | 12/2014 | Huq et al. |
| 8,909,291 B1 | 12/2014 | Spanel et al. |
| 8,938,436 B2 | 1/2015 | Kozempel |
| 8,965,366 B1 * | 2/2015 | Somayajula .......... H04W 60/00 370/328 |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,307,400 B1 | 4/2016 | Blinn et al. |
| 9,313,643 B1 | 4/2016 | Ghoshal et al. |
| 9,357,378 B1 | 5/2016 | Delker et al. |
| 9,363,622 B1 | 6/2016 | Ahn et al. |
| 9,392,395 B1 | 7/2016 | Indurkar |
| 9,398,462 B1 | 7/2016 | Delker et al. |
| 9,420,399 B2 | 8/2016 | Urbanek |
| 9,420,496 B1 | 8/2016 | Indurkar |
| 9,426,641 B1 | 8/2016 | Ghoshal et al. |
| 9,439,025 B1 | 9/2016 | Ghoshal et al. |
| 9,451,446 B2 | 9/2016 | Spanel et al. |
| 2002/0091931 A1 | 7/2002 | Quick, Jr. et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 * | 4/2005 | Macaluso .......... H04W 4/00 455/419 |
| 2005/0085222 A1 | 4/2005 | Przybilski et al. |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0121894 A1 | 6/2006 | Ganesan |
| 2006/0126620 A1 | 6/2006 | Bonar et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | U. Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0262638 A1 | 10/2010 | Fitzgerald |
| 2010/0291898 A1 | 11/2010 | Sanding et al. |
| 2010/0311391 A1 | 12/2010 | Siu et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |

(56) References Cited

U.S. PATENT DOCUMENTS

| | | |
|---|---|---|
| 2011/0119716 A1 | 5/2011 | Coleman, Sr. |
| 2011/0136482 A1 | 6/2011 | Kaliner |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0030512 A1 | 2/2012 | Wadhwa et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142314 A1 | 6/2012 | Mohammed |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1* | 11/2012 | Knauth .................. H04L 63/18 455/411 |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0184029 A1* | 7/2013 | Lim ...................... G06F 9/4448 455/551 |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0295902 A1* | 11/2013 | Justen ..................... H04W 8/22 455/418 |
| 2013/0303142 A1 | 11/2013 | Burcham et al. |
| 2013/0310003 A1 | 11/2013 | Sadhvani Rita et al. |
| 2013/0311836 A1 | 11/2013 | Hurst Cameron et al. |
| 2013/0318518 A1* | 11/2013 | Paalanen ............... H04L 41/082 717/171 |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0065105 A1 | 3/2015 | Masterson et al. |
| 2015/0094041 A1 | 4/2015 | Jung et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0304506 A1 | 10/2015 | Zhu et al. |
| 2015/0331590 A1 | 11/2015 | Yasui |
| 2015/0370428 A1 | 12/2015 | Chan et al. |
| 2016/0094931 A1 | 3/2016 | Urbanek |
| 2016/0234675 A1 | 8/2016 | Ghoshal et al. |

FOREIGN PATENT DOCUMENTS

| | | |
|---|---|---|
| JP | 5924347 B2 | 4/2016 |
| KR | 2006039974 A | 5/2006 |
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |
| WO | WO2016130266 A1 | 8/2016 |

OTHER PUBLICATIONS

Notice of Allowance dated Nov. 2, 2012, U.S. Appl. No. 13/556,202, filed Jul. 24, 2012.

Notice of Allowance dated Jun. 11, 2013, U.S. Appl. No. 13/752,386, filed Jan. 28, 2013.

First Action Interview Pre-Interview Communication dated Feb. 25, 2013, U.S. Appl. No. 13/149,505, filed May 31, 2013.

First Action Interview Office Action dated May 8, 2013, U.S. Appl. No. 13/149,505, filed May 31, 2013.

Notice of Allowance dated Aug. 9, 2013, U.S. Appl. No. 13/149,505, filed May 31, 2013.

First Action Interview Pre-Interview Communication dated Aug. 13, 2013, U.S. Appl. No. 13/335,941, filed Dec. 23, 2011.

Notice of Allowance dated Oct. 9, 2013, U.S. Appl. No. 13/335,941, filed Dec. 23, 2011.

First Action Interview Pre-Interview Communication dated Apr. 23, 2014, U.S. Appl. No. 13/622,234, filed Sep. 18, 2012.

Final Office Action dated Sep. 19, 2014, U.S. Appl. No. 13/622,234, filed Sep. 18, 2012.

FAIPP Pre-Interview Communication dated Mar. 19, 2014, U.S. Appl. No. 13/744,847, filed Jan. 18, 2013.

Notice of Allowance dated Aug. 4, 2014, U.S. Appl. No. 13/744,847, filed Jan. 18, 2013.

FAIPP Pre-Interview Communication dated Jul. 16, 2014, U.S. Appl. No. 13/744,861, filed Jan. 18, 2013.

First Action Interview Pre-Interview Communication dated Apr. 3, 2014, U.S. Appl. No. 13/763,434, filed Feb. 8, 2013.

Final Office Action dated Aug. 19, 2014, U.S. Appl. No. 13/763,434, filed Feb. 8, 2013.

Office Action dated Aug. 7, 2014, U.S. Appl. No. 13/831,504, filed Mar. 14, 2013.

Foreign Communication from a Related Counterpart—International Search Report and Written Opinion, dated Feb. 29, 2012, PCT/US2011/063736, filed on Dec. 7, 2011.

Foreign Communication from a Related Counterpart Application, "Preliminary Report on Patentability", dated Jun. 20, 2013, PCT/US2011/063736 filed on Dec. 7, 2011.

Foreign Communication from a Related Counterpart—International Search Report and Written Opinion, dated Jul. 24, 2013, PCT/US13/40278, filed on May 9, 2013.

(56) References Cited

OTHER PUBLICATIONS

Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16 , 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014,PCT/US14/16650, filed on Feb. 16, 2014.
Urbanek, Robert E., "Delivery of Branding Content and Customizations to a Mobile Communication Device", filed , 201, International Serial No. PCT/US14/56778.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Urbanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
Ghoshal, Jagannath, et al., "Dynamic Subscriber Identity Module," filed Feb. 11, 2015, U.S. Appl. No. 14/619,677.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.

(56) References Cited

OTHER PUBLICATIONS

Amazon Kindle e-book reader, on public sale 2007, http://en.wikipedia.org/wiki/Amazon_Kindle. last accessed on Apr. 13, 2015.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle at Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.

(56) References Cited

OTHER PUBLICATIONS

First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Jan. 13, 2016, International Serial No. PCT/US16/13272.
GHOSHAL, Jagannath, et al., "Dynamic Subscriber Identity Module," filed Mar. 7, 2016, U.S. Appl. No. 15/063,383.
Notice of Allowance dated Apr. 13, 2016, U.S. Appl. No. 14/877,215, filed Oct. 7, 2015.
Ep Search Report dated May 17, 2016, European Application No. 14749499.1, filed on Feb. 8, 2013.
Office Action dated May 3, 2016, U.S. Appl. No. 13/763,443, filed Feb. 8, 2013.
Notice of Allowance dated May 6, 2016, U.S. Appl. No. 14/820,522, filed Aug. 6, 2015.
Advisory Action dated May 3, 2016, U.S. Appl. No. 14/060,712, filed Oct. 23, 2013.
Advisory Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
Office Action dated May 10, 2016, U.S. Appl. No. 14/163,035, filed Jan. 24, 2014.
Notice of Allowance dated Apr. 20, 2016, U.S. Appl. No. 14/297,429, filed Jun. 5, 2014.
Notice of Allowance dated Apr. 13, 2016, U.S. Appl. No. 14/163,041, filed Jan. 24, 2014.
Final Office Action dated Apr. 19, 2016, U.S. Appl. No. 14/231,718, filed Mar. 31, 2014.
Advisory Action dated Jun. 28, 2016, U.S. Appl. No. 14/231,718, filed Mar. 31, 2014.
Benjamin, Jeff, "How to change your iPhone carrier logo without jailbreaking," idownloadblog.com, Dec. 31, 2012.
Wikipedia, "Motorola Fone," Mar. 21, 2016.
Mobile Gazette, Motorola FONE F3 Review, www.mobilegazette.com, Sep. 16, 2007.
Delker, Jason R., et al. "Network Access Tiered Based on Application Launcher Installation," filed May 25, 2016, U.S. Appl. No. 15/164,530.
EP Search Report dated Jul. 7, 2016, European Application Serial No. 13871478.7 filed on Jan. 18, 2013.
EP Search Report dated Aug. 24, 2015, European Application Serial No. 14749462.9, filed on Feb. 8, 2013.
Notice of Allowance dated Sep. 12, 2016, U.S. Appl. No. 13/763,443, filed Feb. 8, 2013.
Office Action dated Oct. 6, 2016, U.S. Appl. No. 14/231,718, filed Mar. 31, 2014.
YOTA Devices, "Hands-on with the YotaPhone: The e-ink Android phone that nobody expected," New York Times, 2010.

* cited by examiner

DIRECTING SERVER CONNECTION BASED ON LOCATION IDENTIFIER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

After its manufacture, a mobile communication device may be delivered to a retail location where it may be purchased by a mobile communication device user. Following its purchase, the mobile communication device may be activated by the mobile communication device user. Once activated, the mobile communication device may have access to a network. While activated with access to the network, the mobile communication device may engage in periodic handshaking with base transceiver stations in which information may be sent to and/or received from the base transceiver stations. The mobile communication device may be hard coded with directions for pulling down customization information from a server and may use its network access to pull down the customization information.

SUMMARY

In an embodiment, a method of customizing a mobile communication device is disclosed. The method comprises receiving, at the mobile communication device, a signal comprising an identification code, comparing the identification code with a plurality of mobile network codes and a plurality of mobile country codes stored in a memory of the mobile communication device, identifying a reference based on the comparing, wherein the reference defines an addressable location providing access to a customization package, and selectively connecting to an open mobile alliance server based on the reference. The method further comprises sending a request to the open mobile alliance server for a customization payload to be sent to the mobile communication device, receiving, at the mobile communication device, the requested customization payload from the open mobile alliance server, and customizing an aspect of the mobile communication device in response to receiving the customization payload.

In an embodiment, a method of customizing a mobile communication device is disclosed. The method comprises receiving, at the mobile communication device, a signal that contains an identification code, wherein the identification code comprises at least one of a mobile network code and a mobile country code, comparing the identification code with at least one of a plurality of mobile network codes and a plurality of mobile country codes stored in a memory of the mobile communication device, and identifying a reference based on the comparing, wherein the reference defines an addressable location providing access to a customization package. The method further comprises connecting to a proxy server selected based on the reference identified by the analyzing, requesting, through the proxy server, a customization payload to be sent to the mobile communication device, receiving, at the mobile communication device, the requested customization payload, and customizing an aspect of the mobile communication device in response to receiving the customization payload.

In an embodiment, a mobile communication device is disclosed. The mobile communication device comprises a processor, a memory, a radio frequency transceiver, and an application stored in the memory that, when executed by the processor, compares an identification code with a plurality of mobile network codes and a plurality of mobile country codes stored in the memory of the mobile communication device, wherein the identification code comprises at least one of a mobile network code and a mobile country code. When executed by the processor, the application further identifies a reference based on the comparison, wherein the reference identifies an addressable location providing access to a customization package, connects the mobile communication device to a server based on the reference identified through the comparison of the identification code, requests a customization payload from the server, receives the customization payload from the server in response to the request, and customizes an aspect of the mobile communication device in response to receiving the customization payload.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
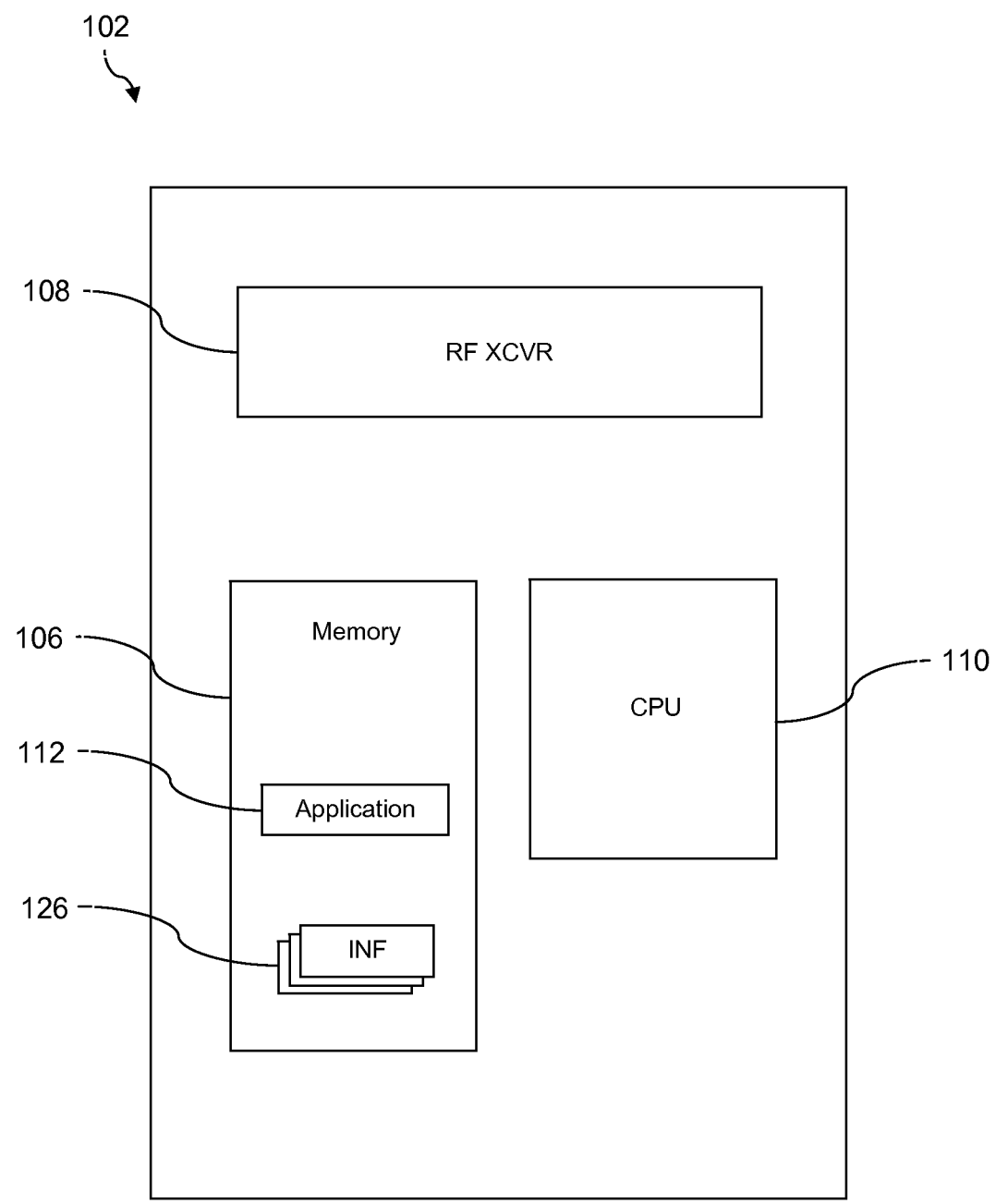
FIG. 1 is an illustration of a mobile communication device according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Formerly, instructions for requesting a customization payload from a set location comprising customization information were hard coded on mobile communication devices. Thus, mobile communication devices intended for different markets and/or countries were hard coded with different instructions. Selectively connecting a mobile communication device to a server from which customization information may be requested and/or received which is identified through analysis of an identification code received from a network may allow a manufacturer to produce mobile communication devices suitable for use in a plurality of different markets and/or countries rather than just one. The manufacturer may find it more convenient to produce mobile communication devices that selectively connect to a server from which customization information may be requested and/or received which is identified through analysis of an identification code than to produce mobile communication devices each hard coded with customization information request instructions for the market and/or country in which it is intended to be used.

The present disclosure teaches selectively connecting a mobile communication device to a server from which customization information may be requested and/or received based on analysis of an identification code received from a network. Customization information may comprise initiation and/or configuration information that may play a role in provisioning the mobile communication device. In an embodiment, the mobile communication device may be a first time out of the box device comprising a system partition and an operator partition, wherein the system partition comprises information hard coded on the mobile communication device. In some cases, the hard coded information in the system partition may be limited to default settings and information configured to run the powering on of the mobile communication device and initiate the acquisition of customization information as described herein. Information stored in the operator partition may be provided by the systems and methods described herein.

In an embodiment, the mobile communication device may be a mobile phone that comprises an application configured to analyze the identification code received from the network by comparing the received identification code with a plurality of mobile network codes and/or a plurality of mobile country codes stored in a memory. The plurality of mobile network codes and the plurality of mobile country codes may be stored in the memory as stand-alone codes, or the mobile network codes may be matched with the mobile country codes and stored as operator codes. The identification code may comprise at least one of a mobile network code, a mobile country code, and/or a system identification number. The identification code may comprise an operator code, wherein the operator code comprises both a mobile network code and a mobile country code.

In an embodiment, the mobile network codes and the mobile country codes stored in the memory may be stored as operator codes, wherein each operator code corresponds to a reference, such as a Uniform Resource Locator (URL), that identifies a server location from which the mobile communication device may request and/or receive customization information. There may be a plurality of references, and each operator code may correspond to a different reference of the plurality of references. In some cases, two or more operator codes may correspond to the same reference. Alternatively, the mobile network codes and the mobile country codes stored in the memory may be stored as stand-alone codes that correspond to a reference, such as a URL, that identifies and provides access to a server location from which the mobile communication device may request and/or receive customization information. Each stand-alone code may correspond to a different reference, or in some cases, different stand-alone codes may correspond to the same reference.

In an embodiment, the application may match the identification code received from the network to one of the mobile network codes, one of the mobile country codes, and/or one of the operator codes stored in the memory that corresponds to a URL and direct the mobile communication device to request a payload comprising customization information to be sent from the server location identified by the URL that corresponds to the mobile network code, the mobile country code, and/or the operator code matched with the identification code. In some contexts, a payload comprising customization information may be referred to as a customization payload. The mobile communication device may be customized in response to receipt of the customization payload. For example, the initial configuration of the mobile communication device may be established based on the customization payload. As another example, when the customization payload comprises logo information, a display of the mobile communication device may be changed to display a logo associated with a business entity in response to receipt of the customization payload.

In an embodiment, the mobile communication device may be a recently activated device with limited network access. The mobile communication device may receive an identification code through wireless handshaking with the network. The mobile communication device may request a customization payload comprising customization information from a regional server identified by matching the received identification code with a URL corresponding to the regional server. The mobile communication device may be customized in response to receiving the customization payload comprising the customization information. For example, the mobile communication device may connect to a given network determined in response to receiving customization information contained in the customization payload.

Turning now to FIG. 1, a mobile communication device 102 is described. In an embodiment, the mobile communication device 102 comprises a radio frequency transceiver (RF XCVR) 108, a processor 110, and a memory 106. In an embodiment, the memory 106 may comprise information 126 and an application 112. The information 126 may comprise one or more network identifiers such as a plurality of mobile network codes and/or a plurality of mobile country codes. The information 126 may further comprise a plurality of operator codes determined by pairing mobile network codes with corresponding mobile country codes. Alternatively, the information 126 may comprise a single mobile network code, a single mobile country code, a single operator code, or combinations thereof. In an embodiment, the mobile communication device 102 may comprise a mobile phone, a smart phone, a personal digital assistant (PDA), a media player, or some other mobile device.

The network identifiers such as mobile network codes, mobile country codes, and/or operator codes stored in the memory 106 may each correspond to a reference that may also be stored as information 126 of the memory 106, where the reference defines an addressable location that provides access to a customization package. In an embodiment, the addressable location may be an Internet Protocol (IP) address, a hardware address within a network, for example a Media Access Control (MAC) address, a classful address, an IPX address, a network layer address, an X.25 address, an X.21 address, a Uniform Resource Locator (URL), or some other network address. Different mobile network codes, mobile country codes, and/or operator codes stored in the memory 106 may correspond to different references stored in the memory 106. Alternatively, different mobile network codes, mobile country codes, and/or operator codes stored in the memory 106 may sometimes correspond to the same reference. Thus, there may be a lesser number of references stored in the memory 106 than there are mobile network codes, mobile country codes, operator codes, or combinations thereof stored in the memory 106. Alternatively, there may be a greater number of references stored in the memory 106 than there are mobile network codes, mobile country coded, operator codes, or combinations thereof stored in the memory 106.

In an embodiment, the mobile communication device 102 may engage in wireless handshaking with a network through signals exchanged between the radio frequency transceiver 108 and a network base station. The wireless handshaking may comprise an exchange of information between the mobile communication device 102 and the network. The network may send an identification code to the mobile communication device 102 during the wireless handshaking or at some other time. The identification code may comprise a numeric code used to identify mobile stations. The identification code may perform a substantially similar function to that performed by mobile country codes and/or mobile network codes. In an embodiment, the identification code may comprise a mobile network code, a mobile country code, an operator code, or other operator information.

The application 112 may analyze the identification code received from the network by comparing it with the plurality of mobile network codes, mobile country codes, and/or operator codes stored as information 126 in the memory 106 of the mobile communication device 102. In an embodiment, the application 112 may compare the received identification code with exclusively mobile network codes, exclusively mobile country codes, exclusively operator codes, or to a set of mobile network codes, mobile country codes, and/or operator codes stored in the memory 106. In some cases the set of mobile network codes, mobile country codes, and/or operator codes stored in the memory 106 to which the received identification code is compared may contain a single mobile network code, a single mobile country code, a single operator code, or combinations thereof.

The mobile network codes, mobile country codes, and/or operator codes stored in the memory 106 to which the received identification code is compared may be variable based on the contents of the identification code. For example, the identification code may be compared exclusively with mobile network codes stored in the memory 106 when the identification code comprises only a mobile network code. The analysis may match the received identification code with a mobile network code, mobile country code, or operator code stored in the memory 106. In some cases, the identification code may comprise codes that do not agree. For example, the identification code may comprise a mobile network code and a mobile country code that do not agree.

In an embodiment, components of the identification code may be given a hierarchical value such that the component of higher hierarchical value takes precedence in a case of disagreement. In this case, the component of higher hierarchical value, which may be a mobile network code, a mobile country code, or something else, may be matched with a mobile network code, a mobile country code, or an operator code stored in the memory 106. In some cases, the identification code may comprise a plurality of codes, wherein at least one of the codes does not agree with the other codes. For example, the identification code may comprise three codes, wherein two codes agree with each other and one code does not. In this case, the codes with the greatest agreement may be given precedence over other codes. Thus, in the example given, the two codes that agree may be given precedence over the one code that does not agree. Cases in which there are multiple disagreements and/or multiple codes in disagreement may be handled in a similar manner, wherein the codes with the greatest agreement may be given precedence. The codes that are given precedence may be matched with mobile country codes, mobile network codes, and/or operator codes as described hereinabove.

A reference stored in the memory 106 corresponding to the matched mobile network code, mobile country code, or operator code stored in the memory 106 may be identified by the application 112. The reference may identify an addressable location that provides access to a customization package. Alternatively, the reference may identify an addressable location from which the mobile communication device 102 may request and/or receive a customization payload, wherein the customization payload may comprise a portion of the customization package, the entire customization package, customization information, other information, or combinations thereof. In some cases, the addressable location from which the mobile communication device 102 may request and/or receive the customization payload and the addressable location that provides access to the customization package may be the same location. In an embodiment, identifying an addressable location that provides access to a customization package and identifying an addressable location from which the mobile communication device 102 may request and/or receive a customization payload may be substantially similar.

The customization package may comprise branding information, power-on animations, power-off animations, wallpaper, a ringtone, a link to an application store, a short code or phone number of customer care center, a short code or phone number of voice mail, one or more applications, one or more widgets, one or more sets of instructions or programs that execute to complete rebranding, customizing, and/or provisioning the mobile communication device, activation information, information directing the selection of a language in which text will be displayed, customer care information, customer account information, abbreviated dialogue codes, application information, display instructions, provisioning instructions, other customization information, or combinations thereof.

In an embodiment, the reference may comprise a Uniform Resource Identifier (URI), such as a URL, that identifies and provides access to a server location that provides access to the customization package. Alternatively, the reference may comprise a URI, such as a Uniform Resource Name (URN), that identifies, but does not provide access to, a server location that provides access to the customization package. In this case, the mobile communication device 102 may use naming information provided by the URN to access the server location independently. In an embodiment, the application 112 may be configured to route the mobile communication device 102 to the server location based on an analysis of the naming information provided by the URN.

In an embodiment, the application 112 may connect the mobile communication device 102 to a server selected based on the reference identified through the analysis of the identification code, wherein a customization package is stored on the server or in a location accessible by the server. The mobile communication device 102 may connect to the server on the same channel from which it received the identification code, or alternatively, the mobile communication device 102 may connect to the server on a different channel. For example, the mobile communication device 102 may receive the identification code from a data channel and connect to the server using a Wi-Fi connection.

Once the mobile communication device 102 is connected to the server, the application 112 may request a customization payload from the server. In some contexts, requesting the customization payload may be substantially similar to requesting the customization package and/or requesting customization information. The customization payload may comprise branding information, power-on animations, power-off animations, wallpaper, a ringtone, a link to an application store, a short code or phone number of customer care center, a short code or phone number of voice mail, one or more applications, one or more widgets, one or more sets of instructions or programs that execute to complete rebranding, customizing, and/or provisioning the mobile communication device, activation information, information directing the selection of a language in which text will be displayed, customer care information, customer account information, abbreviated dialogue codes, application information, display instructions, provisioning instructions, other customization information, or combinations thereof. In some contexts, the customization payload may be taken from or derived from the customization package and may comprise a portion of the customization package, the entire customization package, information not included in the customization package, or combinations thereof.

In an embodiment, the mobile communication device 102 may be a replacement device sent to a user traveling abroad in a foreign country. In this case, the server selected based on the reference identified through analysis of the identification code may fail to identify a user profile associated with the mobile communication device 102. The server may search a global customer repository for the user profile. If the server successfully identifies the user profile associated with the mobile communication device 102 in the global customer repository, the server may reroute the request for the customization payload to the server associated with the user profile. For example, a request for a customization payload from the mobile communication device 102 may be rerouted to a United States server when the mobile communication device 102 belongs to a user from the United States who received the mobile communication device 102 as a replacement for a lost device while traveling abroad.

The application 112 may be configured to customize an aspect of the mobile communication device 102 in response to receiving the customization payload. In some contexts, customizing an aspect of the mobile communication device 102 may be referred to as customizing the mobile communication device 102, customizing a part of the mobile communication device 102, customization of the mobile communication device 102, or customizing a portion of the mobile communication device 102. In an embodiment, customizing an aspect of the mobile communication device 102 may comprise changing from a first brand to a second brand, applying a brand, initiating network connectivity, establishing network specific protocols and configurations, configuring text on a display to appear in the national language of the country the mobile communication device 102 is in, establishing phone numbers in an address book (e.g., star codes, service numbers, etc.), displaying selected applications in response to instructions contained in the customization payload, hiding selected applications in response to instructions contained in the customization payload, altering a display of the mobile communication device 102, or combinations thereof.

Customization of the mobile communication device 102 may be variable according to the contents of the customization payload. For example, a mobile communication device 102 that receives a customization payload comprising a first piece of branding information may be customized to display a different logo than a mobile communication device 102 that receives a customization payload comprising a second piece of branding information, wherein the first and second pieces of branding information are different. Customization may be performed directly by the application 112, by the application 112 eliciting other components of the mobile communication 102 to carry out the customization, or customization may be performed by something else.

In an embodiment, the mobile communication device 102 may be customized by changing and/or adding branding information. Branding information may comprise a logo, an image, a mark, an audible sound, a pattern, a picture, a design, a phrase, a graphic, a shape, or some other information associated with a corporation, an enterprise, a company, an organization, a business, or with another entity. The mobile communication device 102 may receive branding information contained in a customization payload and may change a displayed brand from a first brand to a second brand or display an additional brand. For example, the mobile communication device 102 may receive a customization payload comprising instructions to display a logo associated with a service provider. The logo may be displayed on a home screen of the mobile communication device 102, on a splash screen of the mobile communication device 102, or the logo may be displayed in some other location.

In an embodiment, the mobile communication device 102 may be a recently manufactured device. Following activation, the mobile communication device 102 may be granted limited network access. In some contexts, limited network access may be referred to as slot-0 network access, walled garden network access, or as some other type of network access. The mobile communication device 102 may receive an identification code through handshaking with the network to which it has been granted access. The application 112 may be an Open Mobile Alliance (OMA) client that, when executed by the processor 110, analyzes the received identification code.

The received identification code may be compared with a plurality of mobile network codes, a plurality of mobile country codes, and/or a plurality of operator codes stored in the memory 106. The application 112 may analyze the received identification code, match the received identification code with a mobile network code, a mobile country code, or an operator code stored in the memory 106, identify an associated URL, and access an OMA server location indicated by the URL. The OMA server may provide access to a customization package substantially similar to the customization package described hereinabove. The mobile communication device 102 may send a request for customization information to the OMA server. In some contexts, sending the request for customization information may be substantially similar to sending a request for a customization payload and/or sending a request for a customization package. In an embodiment, the request may be sent by the application 112. Customization information may be sent to the mobile communication device 102 in the form of a customization payload. The customization payload may comprise the customization package to which access was provided by the OMA server, a portion of the customization package to which access was provided by the OMA server, customization information not included in the customization package to which access was provided by the OMA server, combinations thereof, and/or other information.

The application 112 may customize the mobile communication device 102 in response to receiving the customization payload from the OMA server. Customization information contained in the customization payload may include branding information, power-on animations, power-off animations, wallpaper, a ringtone, a link to an application store, a short code or phone number of customer care center, a short code or phone number of voice mail, one or more applications, one or more widgets, one or more sets of instructions or programs that execute to complete rebranding, customizing, and/or provisioning the mobile communication device, activation information, information directing the selection of a language in which text will be displayed, customer care information, configuration information, network specific applications, customer account information, abbreviated dialogue codes, application information, display instructions, and provisioning instructions. In an embodiment, customizing the mobile communication device 102 may comprise eliciting the mobile communication device 102 to change from a first brand to a second brand, apply branding information, configure text on a display to appear in the national language of the country the mobile communication device 102 is in, establish phone numbers in an address book, display selected applications in response to instructions contained in the customization payload, hide selected applications in response to instructions contained in the customization payload, alter a display of the mobile communication device 102, or combinations thereof.

The presence of the application 112 in the mobile communication device 102 may allow the mobile communication device 102 to determine a location from which to request and/or receive customization information, a customization package, or a customization payload without being hard coded with location specific customization information request instructions. Thus, the mobile communication device 102 may be distributed to any one of a plurality of different countries and successfully obtain customization information without being hard coded by location. The mobile communication device 102 may be manufactured in one country and be sent to foreign markets in other countries without hard coded instructions for requesting customization information from a set location. It is contemplated that by providing the application 112 and thereby allowing the mobile communication device 102 to selectively connect to a server based on analysis of an identification code received from a network, mobile communication device 102 manufacturers may be able to produce mobile communication devices 102 with multinational capability not present in mobile communication devices hard coded with location specific customization information request instructions.

Figure 2:
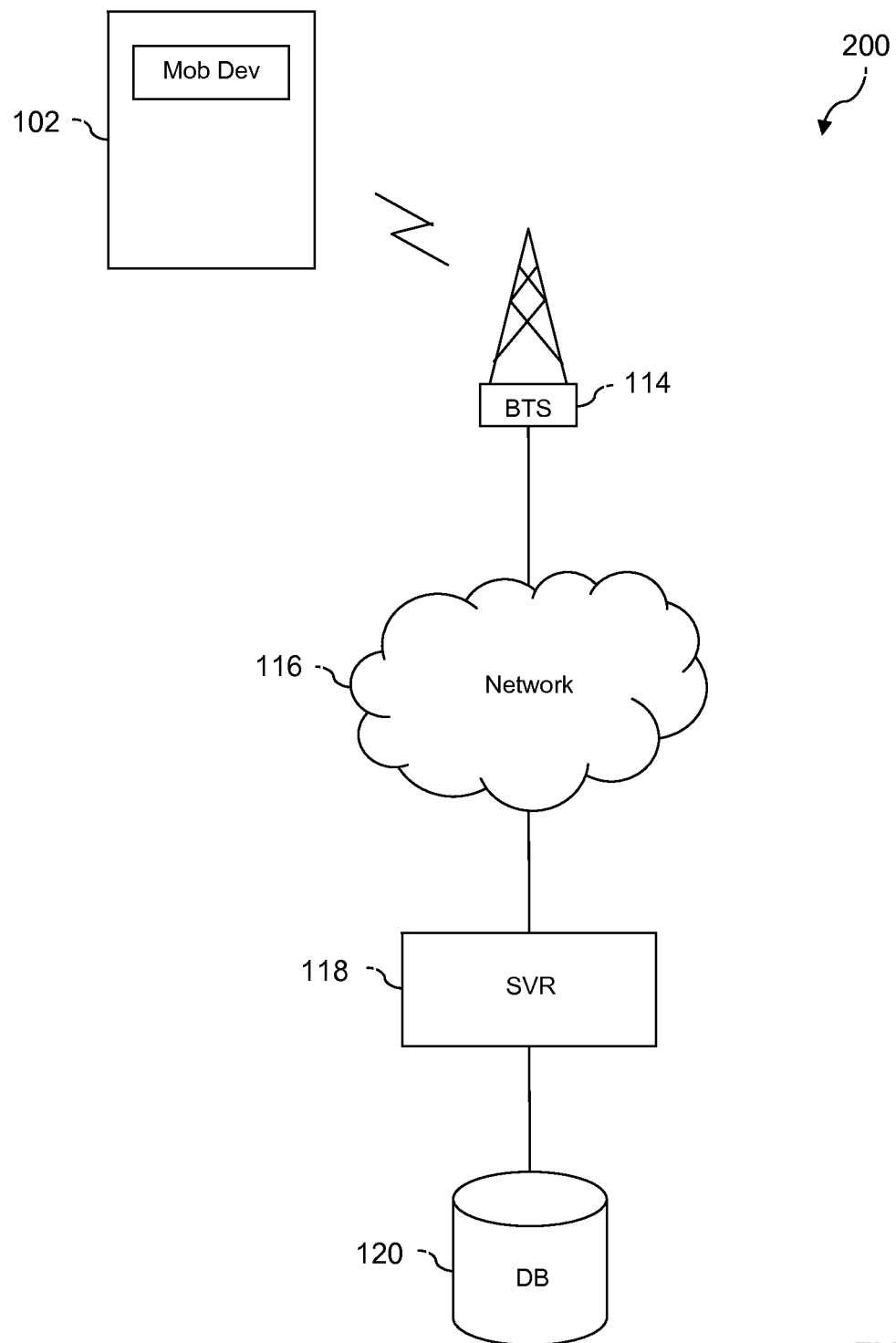
FIG. 2 is an illustration of a communication system according to an embodiment of the disclosure.

Turning now to FIG. 2, a communication system 200 is described. In an embodiment, the communication system 200 comprises the mobile communication device 102, a base transceiver station (BTS) 114, a network 116, a server (SVR) 118, and a data store (DB) 120. The mobile communication device 102 may receive handshaking signals comprising an identification code from the base transceiver station 114. The application 112 of the mobile communication device 102 may analyze the received identification code by comparing it to a plurality of mobile network codes, a plurality of mobile country codes, and/or a plurality of operator codes stored in the memory 106 of the mobile communication device 102.

The mobile network codes, mobile country codes, and/or operator codes stored in the memory 106 may each be matched with a reference stored in the memory 106, wherein the reference defines an addressable location that provides access to a customization package. In an embodiment, the reference may comprise a URL that defines a server location from which the application 112 may request and/or receive the customization package. Alternatively, the reference may comprise a URL that defines a server location from which the application 112 may request a customization payload and/or customization information. As discussed hereinabove with reference to FIG. 1, requesting and/or receiving a customization payload and/or customization information may be substantially similar to requesting and/or receiving the customization package. In some cases, the customization package, customization payload, and customization information may be requested and/or received from the same location.

The application 112 may match the received identification code to a mobile network code, a mobile country code, or an operator code stored in the memory 106, identify the reference matched to the mobile network code, mobile country code, or operator code, and request the customization package from the location defined by the reference. In some contexts, requesting the customization package may be substantially similar to requesting a customization payload and/or requesting customization information.

In an embodiment, the location defined by the reference may be the server 118. The application 112 may direct the mobile communication device 102 to request the customization package from the server 118. The data store 120 may comprise a plurality of customization packages and/or other customization information. The server 118 may obtain the requested customization package from the data store 120 or from another location and may send a portion of the customization package, the entire customization package, and/or other customization information to the mobile communication device 102 in response to the request for the customization package. In some contexts, the sent information may be considered a customization payload.

The application 112 may direct the mobile communication device 102 to make customization changes in response to receiving the customization package. The customization changes may comprise changing from a first brand to a second brand, applying a brand, configuring text on a display to appear in the national language of the country the mobile communication device 102 is in, establishing phone numbers in an address book, displaying selected applications in response to instructions contained in the customization package, hiding selected applications in response to instructions contained in the customization package, and altering a display of the mobile communication device 102.

Figure 3:
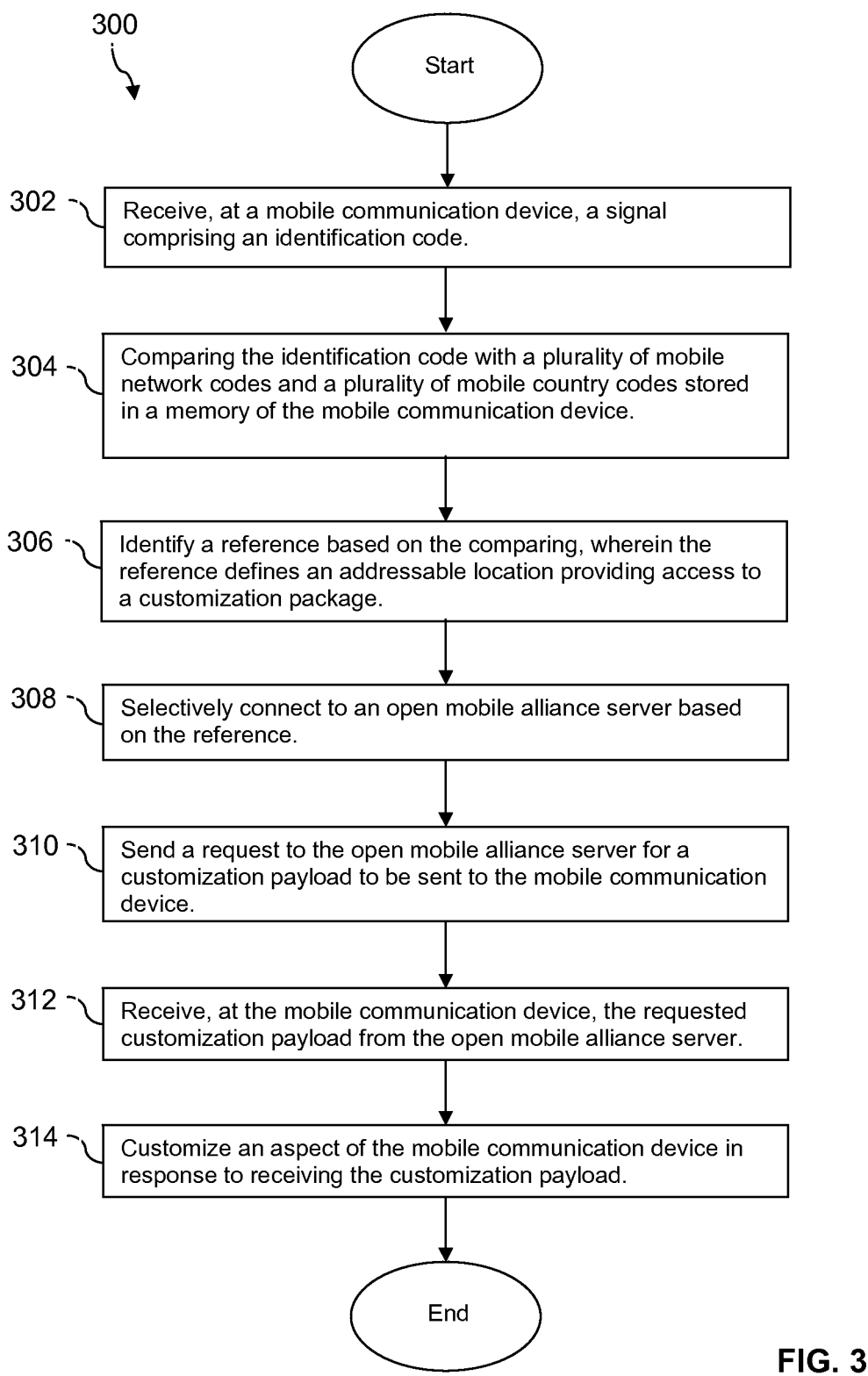
FIG. 3 is a flow chart of a method according to an embodiment of the disclosure.

Turning now to FIG. 3, a method 300 is described. In an embodiment, the method 300 may be implemented in the mobile communication device 102 and/or the communication system 200 described hereinabove with reference to FIG. 1 and FIG. 2. At block 302, a signal may be received at a mobile communication device. In an embodiment, the signal may comprise a handshaking signal and/or some other signal. The signal may comprise an identification code, wherein the identification code may comprise at least one of a mobile network code, a mobile country code, a carrier code, and a Universal Integrated Circuit Card (UICC) code.

In some cases, the identification code may comprise an operator code, wherein the operator code comprises a mobile network code and a mobile country code.

The identification code received through the signal may be analyzed at block 304 by comparing it with a plurality of mobile network codes and a plurality of mobile country codes stored in a memory of the mobile communication device. The identification code may be further compared with a plurality of operator codes stored in the memory. As discussed hereinabove with reference to FIG. 1, the identification code may be compared with a single mobile network code, a single mobile country code, and/or a single operator code. Comparing the received identification code to the plurality of mobile network codes, the plurality of mobile country codes, and/or the plurality of operator codes stored in the memory of the mobile communication device may be performed in a substantially similar manner to the comparing described hereinabove with reference to FIG. 1 and FIG. 2.

At block 306, a reference may be identified based on the comparing, wherein the reference defines an addressable location providing access to a customization package. The customization package may comprise similar elements to those described hereinabove. At block 308, the mobile communication device may selectively connect to an open mobile alliance server based on the reference identified based on the analysis. In an embodiment, the reference may comprise a network address such as a URL that defines an open mobile alliance server through which the mobile communication device may obtain the customization package. A request may be sent to the open mobile alliance server at block 310 requesting a customization payload to be sent to the mobile communication device. The customization payload may comprise similar elements to those discussed hereinabove with reference to customization payloads.

The mobile communication device may receive the requested customization payload from the open mobile alliance server at block 312. An aspect of the mobile communication device may be customized at block 314 in response to receiving the customization payload. In an embodiment, the mobile communication device may be customized in a substantially similar manner to that described hereinabove with reference to FIG. 1 and FIG. 2.

Figure 4:
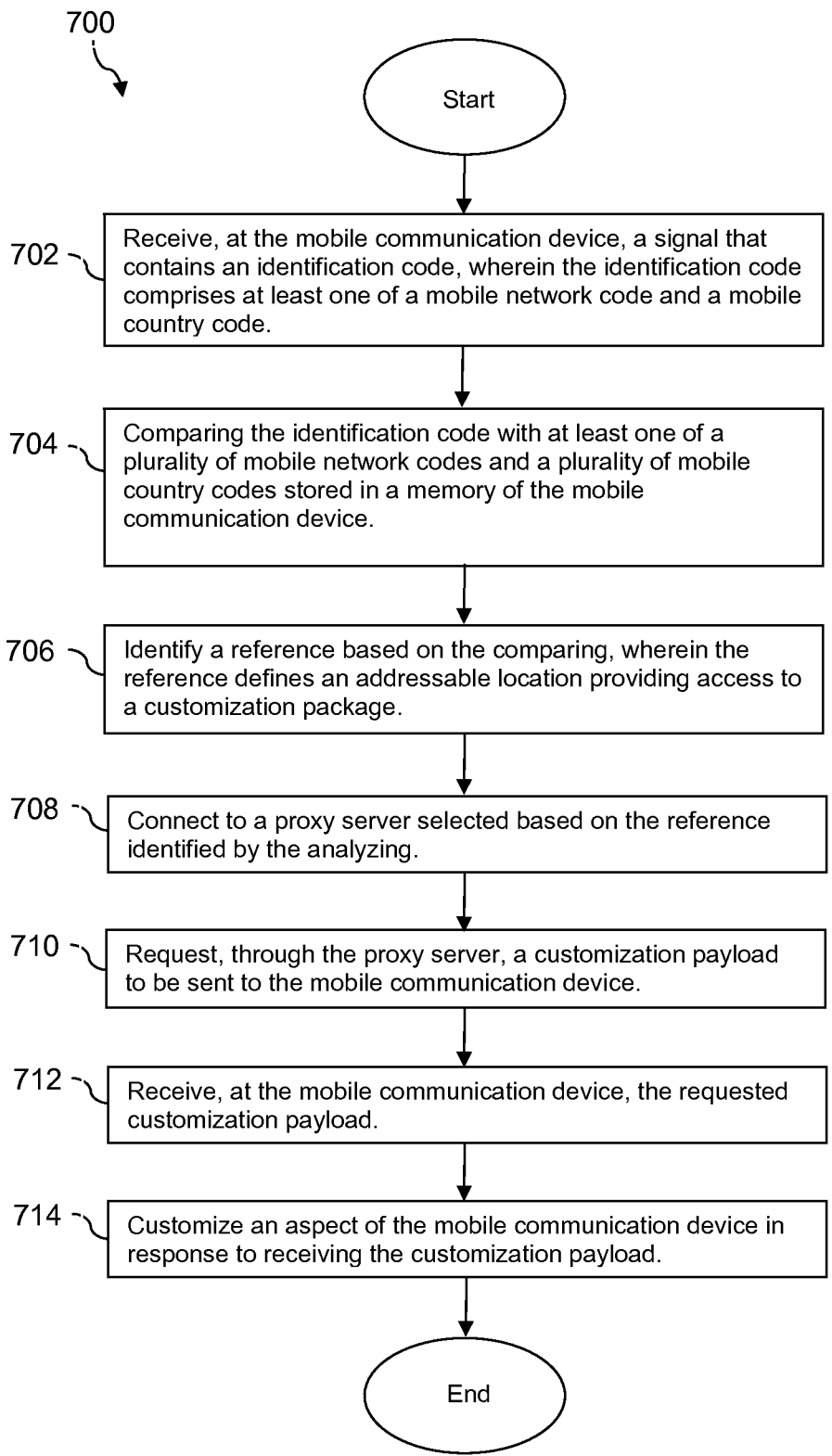
FIG. 4 is a flow chart of a method according to an embodiment of the disclosure.

Turning now to FIG. 4, a method 700 is described. In an embodiment, the method 700 may be implemented in the mobile communication device 102 and/or the communication system 200 described hereinabove with reference to FIG. 1 and FIG. 2. At block 702, a signal may be received at a mobile communication device. As described hereinabove with reference to FIG. 3, the signal may comprise a handshaking signal and/or some other signal. The signal may contain an identification code. In an embodiment, the identification code comprises at least one of a mobile network code and a mobile country code. In some cases, the identification code may comprise an operator code. The identification code may be analyzed at block 704 by being compared with at least one of a plurality of mobile network codes and a plurality of mobile country codes stored in a memory of the mobile communication device. In some cases, the identification code may further be compared with a plurality of operator codes. Alternatively, the identification code may be compared either to a plurality of mobile network codes, a plurality of mobile country codes, or a plurality of operator codes but not to combinations thereof. In some cases, the identification code may be compared to a single mobile network code, a single mobile country code, a single operator code, or to combinations thereof.

A reference may be identified based on the comparing at block 706. The reference may be identified by matching the received identification code to a mobile network code, to a mobile country code, and/or to a mobile operator code stored in the memory of the mobile communication device. The reference may define an addressable location providing access to a customization package. At block 708, the mobile communication device may connect to a proxy server selected based on the reference identified by the analyzing. The proxy server may be configured to route a customization request to a server from which the mobile communication device may request and/or receive the customization package, a customization payload, and/or customization information. A customization request may be a request for customization information, a request for a customization payload, or a request for a customization package.

At block 710, a customization request may be made through the proxy server for a customization payload to be sent to the mobile communication device. The customization payload may be substantially similar to the customization payload described hereinabove with reference to FIG. 1 and FIG. 2 and may comprise substantially similar information. At block 712, the mobile communication device may receive the requested customization payload. An aspect of the mobile communication device may be customized at block 714 in response to receiving the customization payload. The mobile communication device may be customized as described hereinabove.

Figure 5:
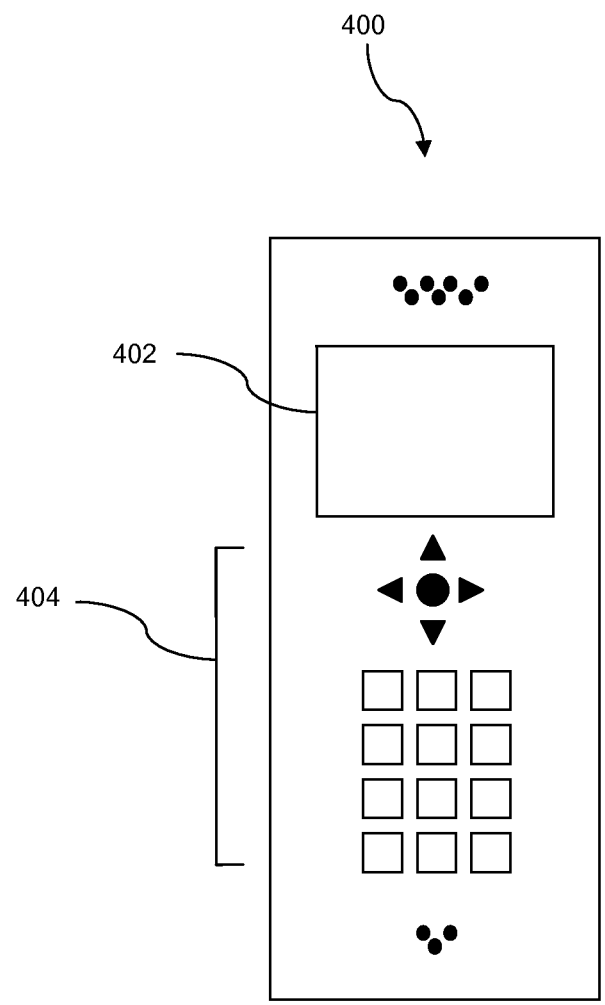
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
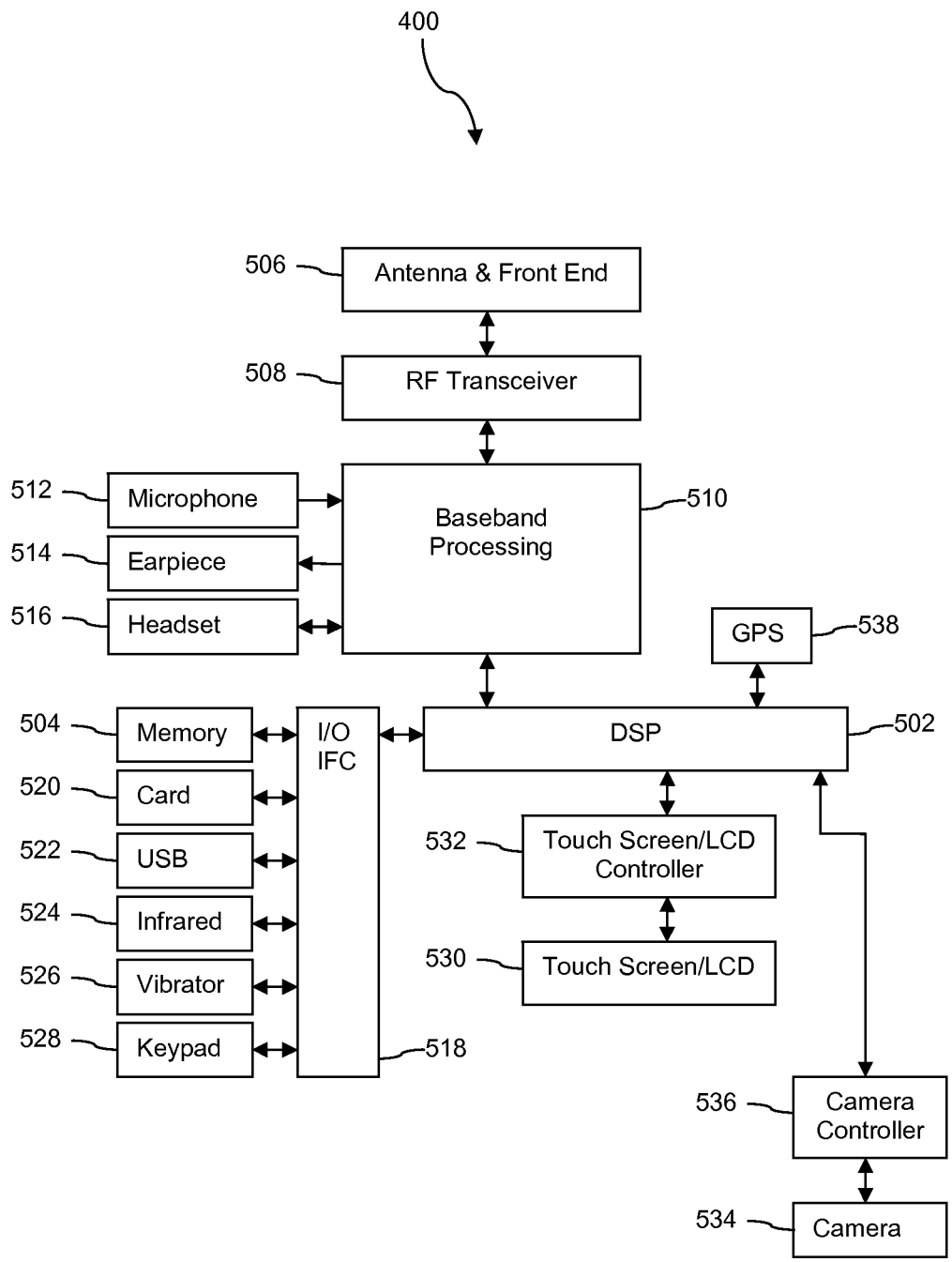
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
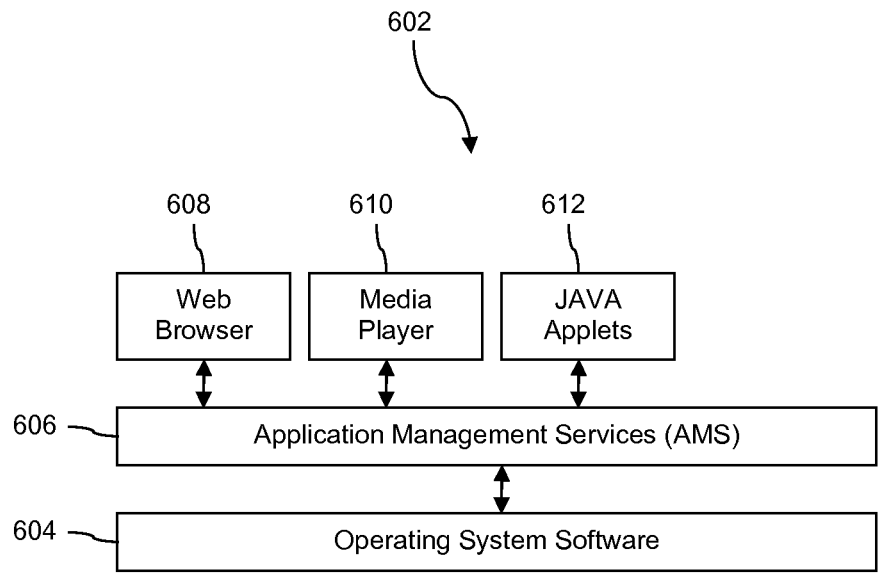
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
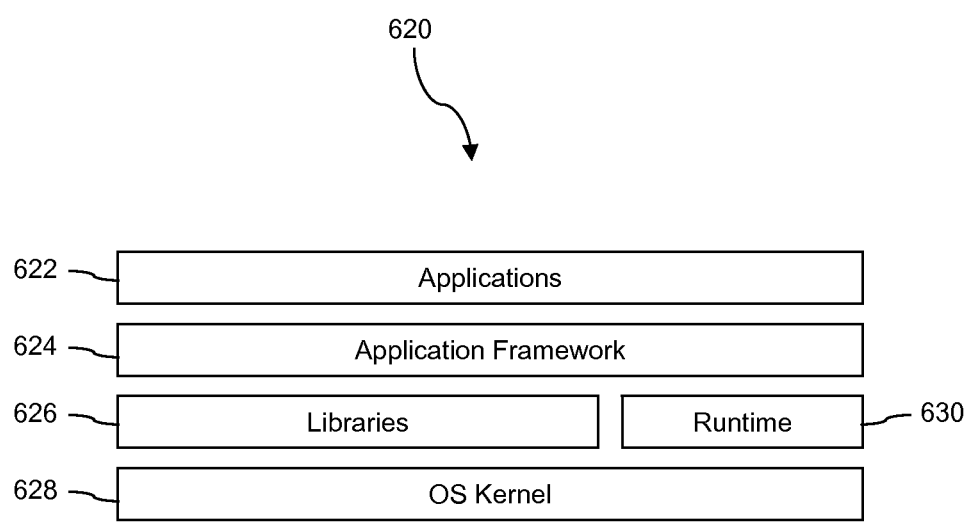
FIG. 7B is a block diagram of another software architecture according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
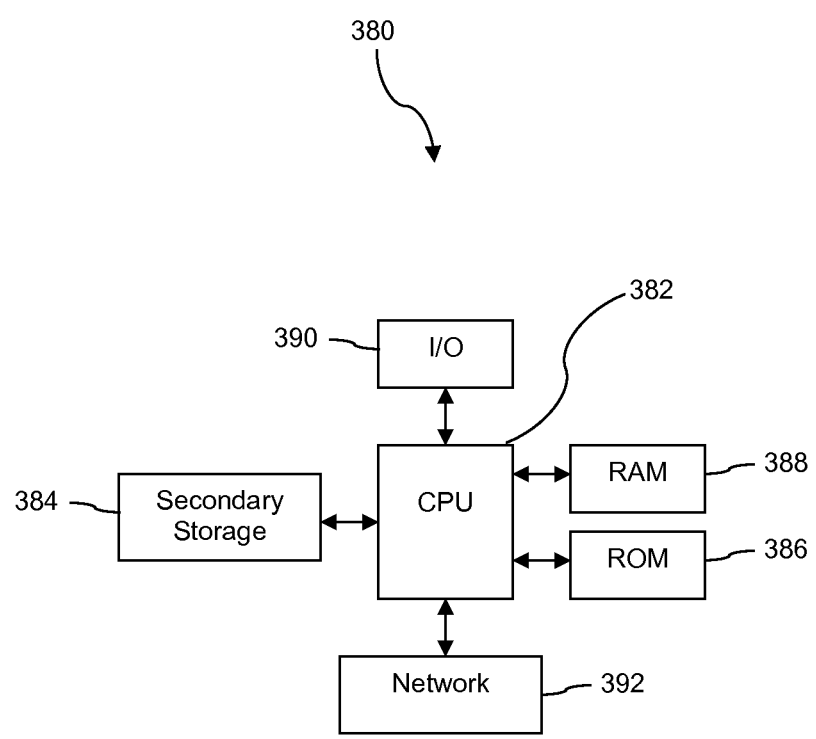
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of customizing a mobile communication device by an application stored in a non-transitory memory of the mobile communication device and executable by a processor on the mobile communication device, said method comprising:
   receiving, at the mobile communication device, a signal comprising an identification code;
   comparing the identification code with a plurality of mobile network codes and a plurality of mobile country codes stored in the non-transitory memory of the mobile communication device, wherein each of the plurality of the mobile network codes and the plurality of mobile country codes corresponds to a uniform resource locator (URL) that identifies a server location from which the mobile communication device is to request and receive customization information;
   identifying a URL and a server location corresponding to the identified URL based on the comparing;
   selectively connecting the mobile communication device to a particular open mobile alliance server at the identified server location based on the identified URL;
   sending a request to the particular open mobile alliance server for a customization payload to be sent to the mobile communication device;
   receiving, at the mobile communication device, the requested customization payload from the particular open mobile alliance server; and
   customizing an aspect of the mobile communication device based on the received customization payload.

2. The method of claim 1, wherein the received customization payload comprises at least one of branding information, information directing a selection of a language in which text will be displayed, customer care information, customer account information, abbreviated dialogue codes, application information, display instructions, or provisioning instructions.

3. The method of claim 1, wherein the customization payload comprises at least one of branding information, information directing a selection of a language in which text will be displayed, customer care information, customer account information, abbreviated dialogue codes, application information, display instructions, or provisioning instructions.

4. The method of claim 1, wherein the identification code comprises at least one of a mobile network code, a mobile country code, a carrier code, or a Universal Integrated Circuit Card (UICC) code.

5. The method of claim 1, wherein customizing an aspect of the mobile communication device comprises at least one of changing from a first brand to a second brand, applying a brand, configuring text on a display of the mobile communication device to appear in the national language of the country the mobile communication device is in, establishing phone numbers in an address book, displaying selected applications in response to instructions contained in the customization payload, hiding selected applications in response to instructions contained in the customization payload, or altering the display of the mobile communication device.

6. A method of customizing a mobile communication device by an application stored in a non-transitory memory of the mobile communication device and executable by a processor on the mobile communication device, said method comprising:
   receiving, at the mobile communication device, a signal that contains an identification code, wherein the identification code comprises at least one of a mobile network code or a mobile country code;
   comparing the identification code with at least one of a plurality of mobile network codes or a plurality of mobile country codes stored in the non-transitory memory of the mobile communication device, wherein each of the plurality of the mobile network codes and the plurality of mobile country codes corresponds to a uniform resource locator (URL) that identifies a server location from which the mobile communication device is to request customization information;
   identifying a URL and a server location corresponding to the identified URL based on the comparing, wherein the identified URL defines an addressable location providing access to a customization package;
   selectively connecting to a particular proxy server at the identified server location based on the identified URL;
   requesting, through the particular proxy server, a customization payload to be sent to the mobile communication device;
   receiving, at the mobile communication device, the requested customization payload; and
   customizing an aspect of the mobile communication device based on the received customization payload.

7. The method of claim 6, wherein the customization package comprises at least one of branding information, information directing a selection of a language in which text will be displayed, customer care information, customer account information, abbreviated dialogue codes, application information, display instructions, or provisioning instructions.

8. The method of claim 6, wherein the customization payload comprises at least one of branding information, information directing a selection of a language in which text will be displayed, customer care information, customer account information, abbreviated dialogue codes, application information, display instructions, or provisioning instructions.

9. The method of claim 6, wherein the identification code is an operator code.

10. The method of claim 6, wherein the customization payload is sent from an open mobile alliance server to the mobile communication device.

11. The method of claim 6, wherein customizing an aspect of the mobile communication device comprises at least one of changing from a first brand to a second brand, applying a brand, configuring text on a display of the mobile communication device to appear in the national language of the country the mobile communication device is in, establishing phone numbers in an address book, displaying selected applications in response to instructions contained in the customization payload, hiding selected applications in response to instructions contained in the customization payload, or altering the display of the mobile communication device.

12. A mobile communication device, comprising:
a processor;
a non-transitory memory;
a radio frequency transceiver; and
an application stored in the memory that, when executed by the processor,
compares an identification code with a plurality of mobile network codes and a plurality of mobile country codes stored in the non-transitory memory of the mobile communication device, wherein the identification code comprises at least one of a mobile network code or a mobile country code, and wherein each of the plurality of mobile network codes and the plurality of mobile country codes corresponds to a uniform resource locator (URL) that identifies a server location from which the mobile communication device is to request and receive customization information,
identifies a URL and a server location corresponding to the identified URL based on the comparison, wherein the identified URL identifies an addressable location providing access to a customization package,
connects the mobile communication device to a particular server at the identified server location based on the identified URL,
requests a customization payload from the particular server,
receives the customization payload from the particular server in response to the request, and
customizes an aspect of the mobile communication device based on the received customization payload.

13. The mobile communication device of claim 12, wherein the particular server is an open mobile alliance server.

14. The mobile communication device of claim 12, wherein the application customizes an aspect of the mobile communication device by eliciting the mobile communication device to perform at least one of changing from a first brand to a second brand, applying a brand, configuring text on a display of the mobile communication device to appear in the national language of the country the mobile communication device is in, establishing phone numbers in an address book, displaying selected applications in response to instructions contained in the customization payload, hiding selected applications in response to instructions contained in the customization payload, or altering the display of the mobile communication device.

15. The mobile communication device of claim 12, wherein the customization package comprises at least one of branding information, information directing a selection of a language in which text will be displayed, customer care information, customer account information, abbreviated dialogue codes, application information, display instructions, or provisioning instructions.

16. The mobile communication device of claim 12, wherein the customization payload comprises at least one of branding information, information directing a selection of a language in which text will be displayed, customer care information, customer account information, abbreviated dialogue codes, application information, display instructions, or provisioning instructions.

17. The method of claim 12, wherein the customization payload is derived from the customization package.

* * * * *